Aug. 22, 1950     S. K. WELLMAN     2,519,865
FRICTIONAL APPARATUS

Filed July 23, 1945     4 Sheets-Sheet 1

INVENTOR:
S. K. Wellman
BY Ray S. Gehr
ATTORNEY.

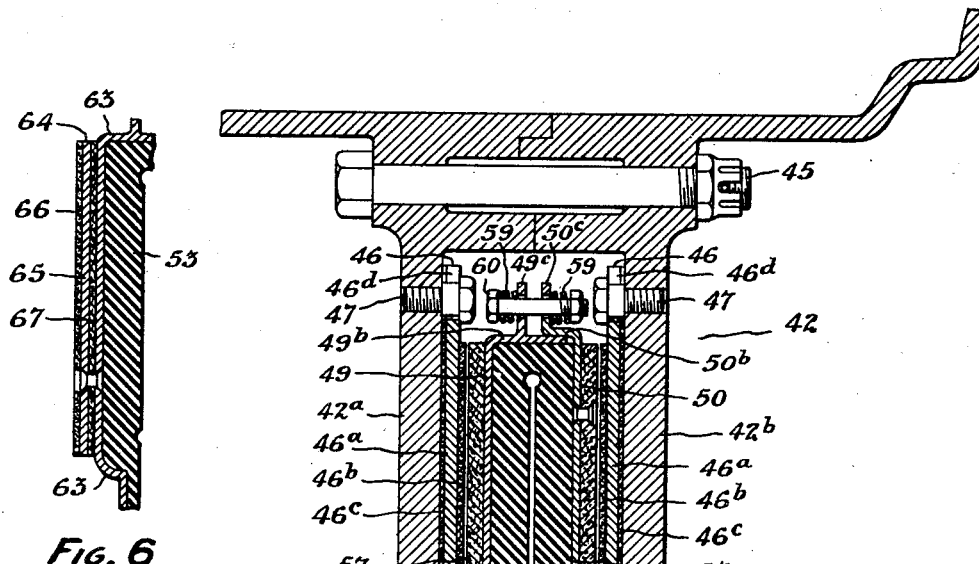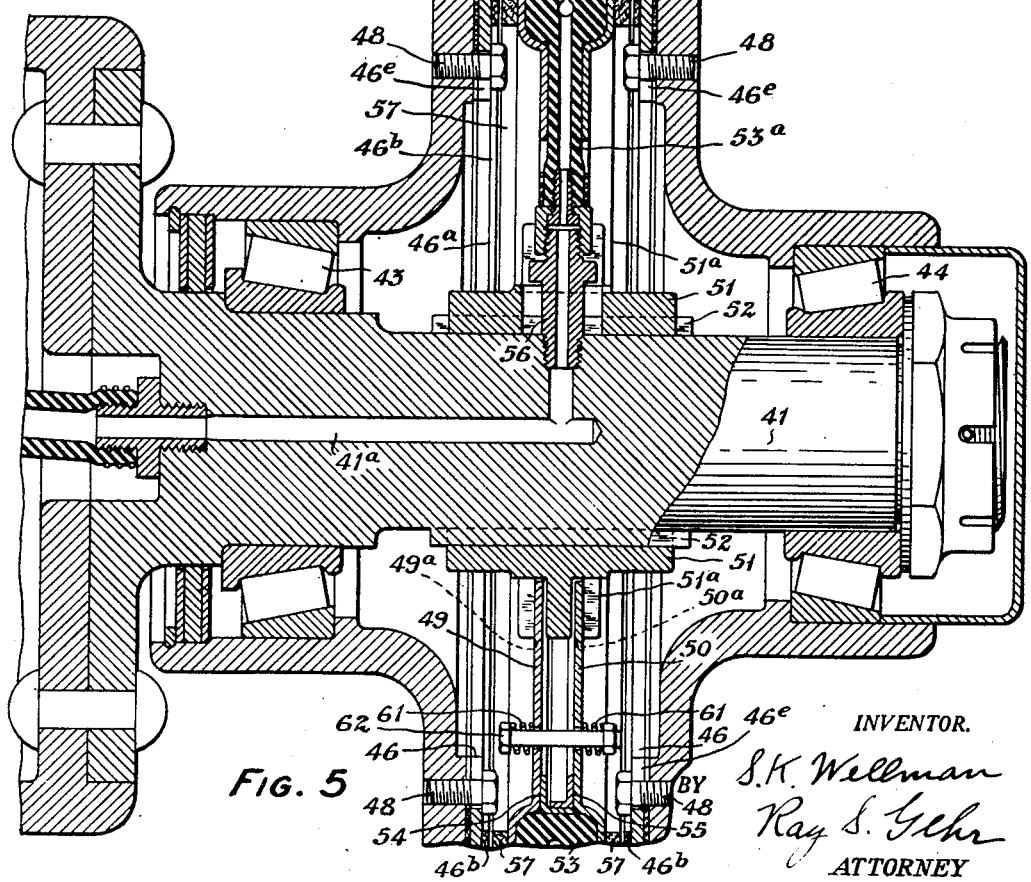

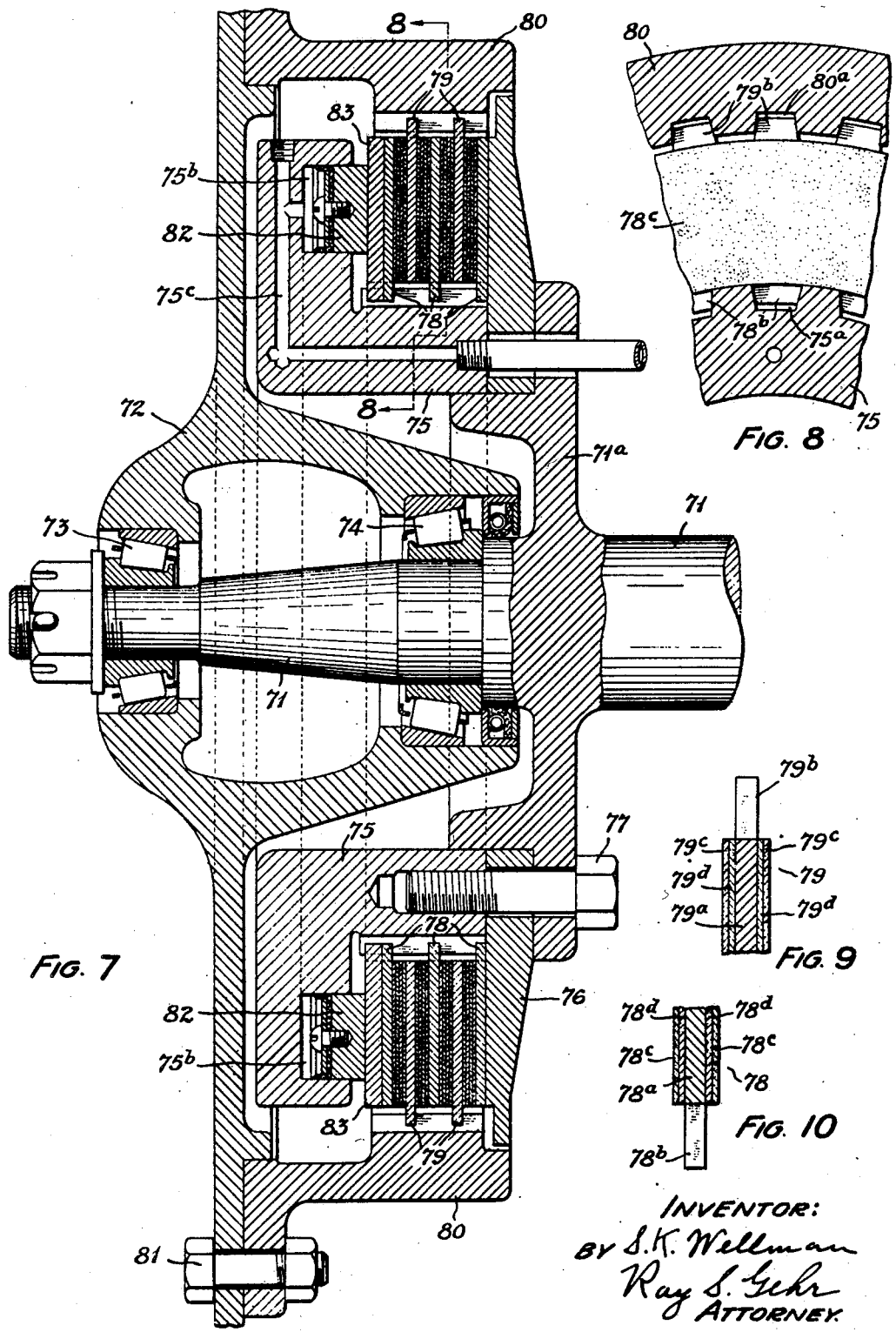

Aug. 22, 1950 S. K. WELLMAN 2,519,865
FRICTIONAL APPARATUS
Filed July 23, 1945 4 Sheets-Sheet 4
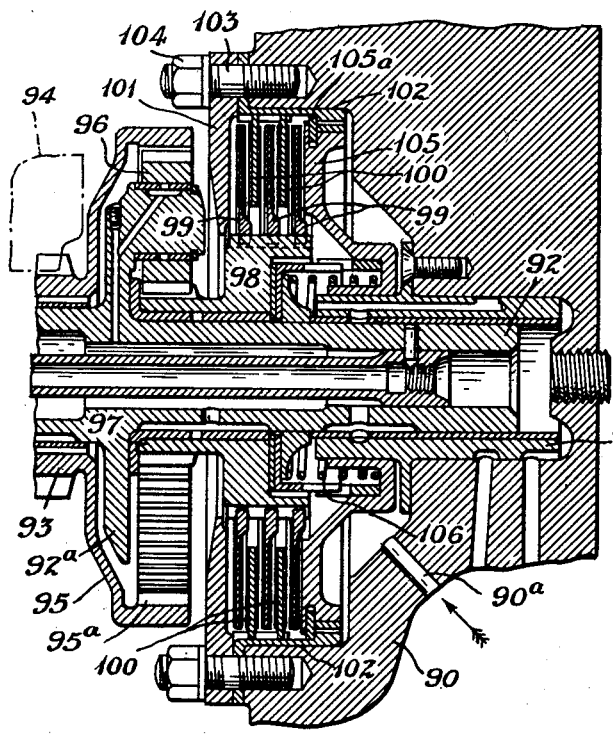
Fig. 11
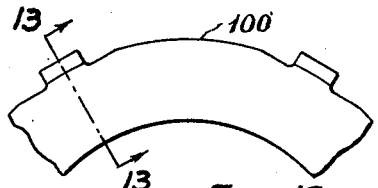
Fig. 12
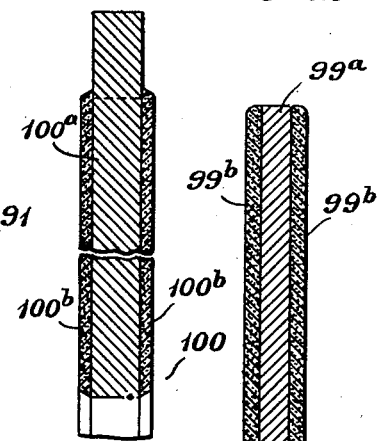
Fig. 13
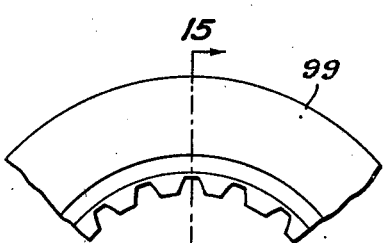
Fig. 14
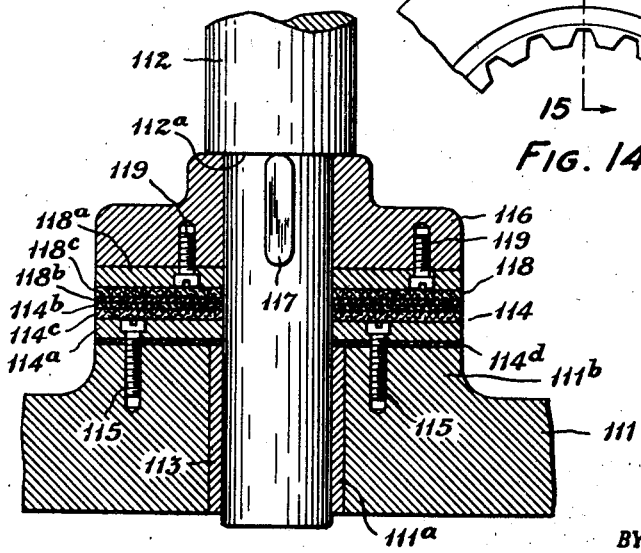
Fig. 16
Fig. 15
INVENTOR.
BY S. K. Wellman
Ray S. Gehr
ATTORNEY Patented Aug. 22, 1950

2,519,865

UNITED STATES PATENT OFFICE 2,519,865

FRICTIONAL APPARATUS

Samuel K. Wellman, Cleveland Heights, Ohio, assignor to The S. K. Wellman Company, Cleveland, Ohio, a corporation of Ohio Application July 23, 1945, Serial No. 606,487

7 Claims. (Cl. 192—107)

This invention relates to brakes, clutches and other frictional devices, including bearings, in which more or less slippage occurs between mutually engaging structures in the normal operation of the devices.

In the operation of brakes and clutches the heat generated by relative slippage of the mutually engaging frictional surfaces causes high temperatures which may have very injurious effects upon the friction elements and the parts carrying the said elements. The same thing is true of bearings in the operation of which normal operating conditions and temperatures are not maintained. In the case of brakes and clutches, such high temperatures and injurious effects are particularly likely to result where the brake or clutch must serve under severe operating conditions, as in the case of the brakes of large airplanes and of trucks and busses operating in mountainous regions, and in the case of the clutches of large trucks, busses and tractors and even of small automobiles if the clutch is operated by the driver in a manner to cause excessive slippage between the friction elements. In the case of bearings the injurious effects in question usually occur under abnormally heavy loads and when normal lubrication fails, or has not yet been established at the start of the relative movement of the frictional parts.

The injurious effects referred to take various forms but the most serious effects are the warping, contracting and expanding and the checking and progressive cracking of ferrous metal brake and clutch parts subjected to the excessive heat, and the scuffing of bearing surfaces and mechanical disintegration of bearing structures. These injurious effects vary with the type of brake, clutch and bearing constructions involved but none of the known sliding friction types of construction heretofore used is immune from such injurious effects.

In the use of brakes and clutches having steel or iron elements with sintered metallic facings such as described in United States Letters Patent No. 2,178,527, difficulties have been encountered under severe or heavy duty service conditions due to distortion or weakening of the steel or iron parts of the friction elements. Thus in the case of disc brakes of the sort in question used on the ground wheels of large transport and bomber airplanes the braking loads which must be sustained are extremely severe and the friction elements of the brakes, when the planes land, are raised to temperatures as high as 900° to 1100° F. or even higher. Under such severe service there results distortion of the friction elements in the form of permanent expansion and warping and the proper operation of the brake is interfered with.

Similarly, in the case of clutch discs such as that described in the said Patent No. 2,178,527 and composed of a plain steel disc with sintered metal facing rings welded thereto, it has been found that under severe service with a high rate of heat generation, the disc becomes sufficiently warped to interfere with satisfactory operation.

Also, in the case of heavy duty vehicle brakes of the drum type more or less similar difficulties have been encountered. Thus in the conventional form of drum brakes in which expanding shoes lined or faced with molded compositions of asbestos or the like engage the unlined inner drum surface of ferrous metal, it has been found that under heavy duty conditions, as where heavy trucks are operated in mountainous districts, the metal forming the friction surface of the brake drum is subject to injury of a peculiar sort. The injurious effect usually starts with a superficial checking of the metallic friction surface and under continued service of the brakes the cracks deepen until disintegration of the metal structure results, and a replacement of the injured drum is necessary; and naturally the roughening of the friction surface of the drum caused by the checking and cracking of the metal causes a rapid wear and deterioration of the facing of the brake shoes.

In the case of bearings the injuries in question usually start with a scuffing of the bearing surface. This may be followed by roughening of the mating journal surface with resultant generation, usually locally, of excessively high temperatures and, in the case of anti-friction metal bearings, the disintegration of the anti-friction metal part and its separation from its backing or shell.

It is an object of the present invention to produce new and improved frictional apparatus having mutually engaging frictional members both of which are capable of sustaining relatively severe localized thermal expansion and contraction of their facing portions without serious injury and deterioration and without loss of smooth operating characteristics.

A further object of the invention is to provide clutch and brake apparatus having the characteristics specified in the above stated object and in addition large load-carrying capacity in relation to size.

Another object of the invention is to provide frictional apparatus of the character first stated above in which the mutually engaging frictional members comprise means for facilitating the distribution of frictionally generated heat to minimize local thermal expansion and contraction of the frictional facings and by this added advantage attain extremely high energy dissipating capacity with smooth operation and long life.

Various other objects of the invention ancillary or incidental to the objects stated above will be made apparent in the description which follows:

The present application is a continuation in part of the joint application of the present applicant and C. B. Sawyer, Serial No. 443,562 filed May 19, 1942, on which Patent No. 2,381,941 was granted August 14, 1945. That application discloses two structural expedients or types of construction designed to overcome the difficulties described above, namely, (1) a multiple layer metallic frictional member so constructed as to minimize unequal heating and resultant unequal thermal expansion and contraction of different parts of the member and (2) a pair of mutually engaging frictional members both of which have frictional facings peculiarly adapted in service to sustain without injury severe local heating and resultant unequal expansion and contraction of the members, with at least one of the members having its facing formed of compacted and sintered metallic powder material. The latter of these two types of construction, either alone or in combination with the expedient of the first type, being the sole invention of the present applicant constitutes the subject of the present application.

With the stated objects in view the invention consists in novel constructions and combinations of parts hereinafter fully explained in connection with several embodiments of the invention shown in the accompanying drawings and defined in the claims.

In the drawings,

Fig. 5 is a fragmentary axial sectional view of an airplane wheel and brake mechanism enclosed therein, this construction illustrating the application of the present invention to a disc type of brake.

Fig. 6 is a fragmentary sectional view showing a modification of the construction illustrated in Fig. 5.

Fig. 7 is an axial sectional view showing a brake of multiple disc type embodying the invention.

Fig. 8 is a fragmentary section on the line 8—8 of Fig. 7.

Figs. 9 and 10 are fragmentary radial sectional views on an enlarged scale of two of the frictional rings of the brake shown in Fig. 7.

Fig. 11 is an axial sectional view of a disc clutch embodying the invention.

Fig. 12 is a side elevation of a portion of one of the friction rings of the clutch shown in Fig. 11.

Fig. 13 is an enlarged section on line 13—13 of Fig. 12.

Fig. 14 is a side elevation of a portion of one of the friction rings that engage the rings such as that illustrated in Fig. 12.

Fig. 15 is an enlarged section on the line 15—15 of Fig. 14.

Fig. 16 is an axial sectional view of a step bearing embodying the invention.

Figure 1:
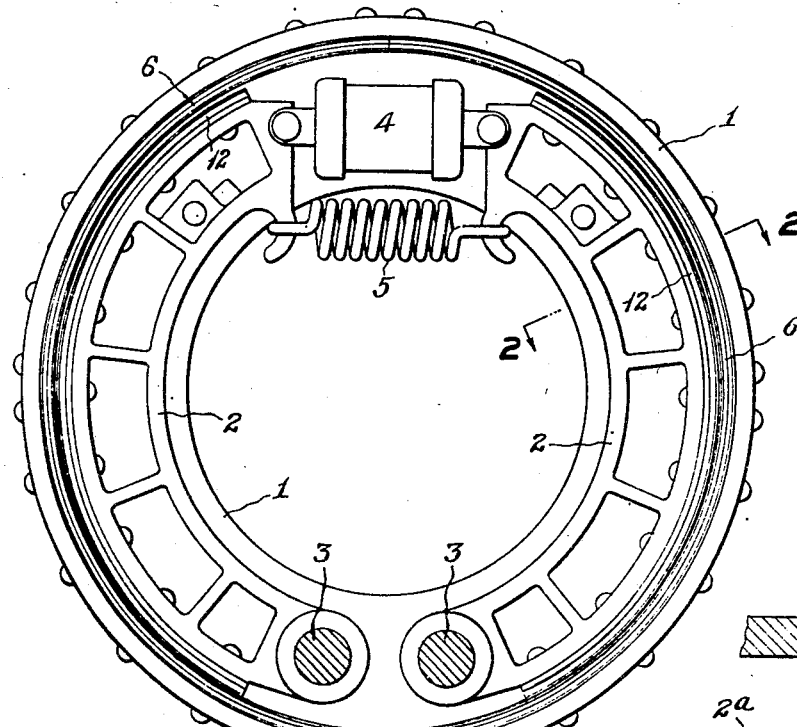
Fig. 1 is a side elevation of brake mechanism of the drum type embodying the invention.
Figure 2:
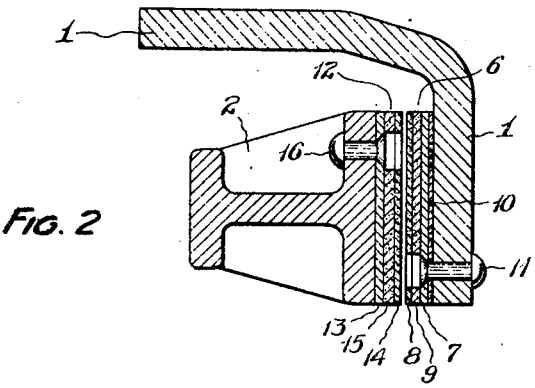
Fig. 2 is an enlarged section on the line 2—2 of Fig. 1.

Referring in detail to the structures illustrated in the drawings and first to Figs. 1 and 2, 1 designates a brake drum such as is used on motor vehicle wheels and which may be either cast or pressed from iron or steel of a suitable type. The numerals 2, 2 indicate the usual type of brake shoes, said shoes being mounted on pivotal supports 3, 3 carried by the axle structure (not shown). 4 indicates a brake-actuating hydraulic cylinder of the conventional type and 5 is a retracting spring connected to the movable ends of the brake shoes in well known manner.

The brake drum 1 is provided with a lining designated as an entirety by the numeral 6. As shown in Fig. 1, the lining is divided into two semicircular parts. Each of said parts has a unitary multiple-layer construction and comprises a backing strip or structural layer 7 preferably of sheet steel, a friction facing layer 8 and an intermediate layer 9 between the backing 7 and the friction facing 8. In the construction shown, the facing layer 8 is of the sintered metallic type formed by compacting and sintering a mixture of powdered or finely divided material consisting predominantly of high-melting-point metal such, for example, as copper and/or iron, mixed with minor amounts of low-melting-point metal such as tin, zinc, lead and the like and usually some graphite and some finely divided abrasive material such as silica. Frictional facings of this character and methods and apparatus for making them are disclosed in United States Patent No. 2,178,527 to which reference may be made for detailed information.

The intermediate layer 9 is made entirely of metal having a high melting point and a thermal conductivity high in comparison with the material of the facing 8 and the steel backing strip 7. Among the metals technically suitable for the intermediate layer 9 are silver, copper, aluminum and other metals having high melting points and comparatively high thermal conductivity, such for example as copper-silver, copper-chromium and copper-beryllium alloys. Practically, however, copper is the most generally suitable metal since, while its thermal conductivity is somewhat lower than that of silver, the difference is not great and its melting point is higher than that of silver, so that there is little to offset the great advantage of copper's lower cost. In the specific construction illustrated in Figs. 1 and 2, the intermediate layer 9 is formed of compacted and sintered copper powder.

A composite multiple-layer structure comprising the layers 7, 8 and 9 may be fabricated in a variety of ways so as to produce an integral structure. For example, the layers 8 and 9 may be separately formed by briquetting, as described in said Patent No. 2,178,527, and then assembled with the steel strip 7 after the latter has been prepared, as by electroplating with copper, in accordance with the procedure disclosed in the said Patent No. 2,178,527 and the three layers integrally united by the sintering of the layers 8 and 9. Alternatively, the layer 9 may be formed and sintered to the steel strip 7 and the layer 8 may then be briquetted and attached to the layer 9 by sintering. Of course also the two layers 8 and 9 may be briquetted and sintered together and thereafter welded to the suitably prepared steel strip 7.

In order to facilitate the production of a suitable intimate union between the friction lining 6 and the drum 1, I prefer to interpose between strip 7 and the drum flange a thin metallic layer 10 having a malleable or deformable structure. The layer 10 should be formed of high-melting-point metal and I prefer to employ copper and preferably sintered finely divided copper for the purpose as it provides a more or less porous structure having a suitable degree of malleability and deformability and at the same time has relatively high thermal conductivity. The layer 10 may be introduced as a separate element between the lining unit 6 and the drum 1 but I prefer ordinarily to make it an integral part of the lining 6 by sintering it to the outer side of the steel strip 7. This may be accomplished in the operation of sintering the other layers 7, 8 and 9, together. The lining 6 is suitably perforated as shown in Fig. 2 to receive rivets 11 which serve to mechanically secure the lining 6 rigidly to the brake drum. In this connection it is observed that the strength of the solid metal layer 7 is not only transmitted to the sintered metal layers 9 and 8 but also provides the strength and rigidity to make feasible the riveted or other equivalent mechanical connection between the lining and the drum 1. In some cases if a high degree of thermal conductivity between the lining 6 and the drum 1 is not required the layer 10 may be formed of a mixture of copper and some lower melting point metal such as tin, the mixture however consisting predominantly of copper so that the metal of the layer shall have a relatively high melting point and lower thermal conductivity. Alternatively, the layer 10 may be formed by sintering powdered metal such as aluminum.

For engagement with the lining 6 of the drum 1 the brake shoes 2 are each provided with a multiple-layer integral facing 12 comprising a steel strip 13, a facing strip 14 of sintered material and an intermediate layer 15 of sintered copper, such three-layer part being fabricated in the same manner as the layers 7, 8 and 9 of the lining 6. The facing 12 is secured to the shoes 2 by rivets 16.

Brake apparatus such as that shown in Figs. 1 and 2 is capable of acceptable performance at remarkably high rates and total quantities of energy absorption. In addition the brake is characterized by notable smoothness of operation, low rate of wear and absence of distortion and disintegration of the parts. A major contributing factor of this result is the capability of the frictional facing structures on both the drum and the shoes to undergo localized thermal expansion and contraction without disintegration. It is believed that this virtue of the apparatus is due in turn to the porous nature of the facing materials and their consequent ability to locally expand and contract without exceeding the elastic limits of the material. The sintered metallic materials making up the layers 8, 9 and 14, 15 constitute metallic networks with more or less uniformly distributed minute pores. The networks furthermore are formed of relatively strong and high melting point metals. In consequence the frictional facing structures are well adapted to undergo without injury local expansion and contraction incident to localized hot spots created in the operation of the brake under heavy load.

A further factor importantly contributing to the highly favorable operating result secured with the improved brake is the high thermal conductivity of the sintered copper intermediate layers 9 and 15 of the facings 6 and 12, respectively. Thus in the case of the facing or lining 6, the intermediate layer 9 by rapid distribution of heat generated at the mutually engaging friction surfaces of the brake minimizes local heating and corresponding local expansion of the lining structure, thus permitting the lining to sustain a heavier heat load without injury than would be possible without the superior distribution of heat provided by the layer 9.

The friction facings 12 of the shoes 2 function in substantially the same manner as does the lining 6 of the brake drum. In the case of the shoes the steel backing layer 13 has not been provided with a facing of deformable metal corresponding to the layer 10 of the lining 6 because the shoes, being ordinarily enclosed, cannot dissipate heat as readily as the drum 1 and it is therefore desirable to carry off the major part of the heat generated through the drum, this result being facilitated by providing better thermal contact between the lining 6 and the drum than between the facing 12 and the shoe.

In the practice of the present invention it is highly important that both of the mutually engaging friction members be constructed so that each is capable of sustaining the high heat loads contemplated without disintegration incident to the severe localized thermal expansion and contraction. The reason for this is that undue wear or disintegration of the friction surface of one of the members will in turn cause mechanical injury and disintegration of the second friction member even though the latter be structurally adapted itself to withstand severe heat loads and service. In other words the pair of mutually engaging friction members are to be looked upon as interdependent and each must be inherently capable of withstanding severe heat loads if failure of the pair of members is to be avoided. This condition is well met by forming both of the pair of frictional members of sintered metallic material.

Because of the relatively high temperature at which it is feasible to operate frictional apparatus constructed in accordance with the present invention without undue injury or rapid deterioration thereof it is desirable that the frictional lining and facing structures be in all respects capable of withstanding such temperatures. This end is secured, in the case of the lining structure 6, for example, by making the frictional layer 8 predominantly of high-melting-point metal, the intermediate layer 9 also of high-melting-point metal and by integrally uniting the intermediate layer to the layer 8 and to the layer 7 by means of bonds capable of withstanding the said high temperatures without disintegration under operating stresses. Such bonds are readily effected between the layers 8 and 9 by heating such layers to sintering temperatures, depending upon their compositions, and under conditions set forth in the aforesaid Patent No. 2,178,527. Also such bonds between sintered material and sheet steel, as between the layer 9 and the layer 7 of the lining 6, can be effected by the direct welding method disclosed in said Patent No. 2,178,527. However, such direct welding of the sintered layers to the solid metal layer is not essential in the carrying out of the invention since an alloy bond between the layers can be produced by the use of an intermediate bonding layer of high-melting-point metal. The direct welding method, however, has the advantage of lower cost.

Similarly the means for effecting the connection between the lining 6 and the brake drum 1 should be capable of withstanding the high temperatures in question without disintegration and that end is secured, for example, by the use of rivets of adequate holding capacity. Where the union between the lining 6 and the drum 1 includes a layer of deformable metal, such as the layer 10, this layer also should be formed of metal of high melting point. In the operation of high duty brakes, temperatures of the brake parts have been observed with thermocouples as high as 900° to 1100° F., indicating still higher temperatures in some parts of the structure, and the expressions "high temperatures" and "high-melting-point metals," as used herein, refer to temperatures and to melting points upwards of 900° F.

Figure 3:
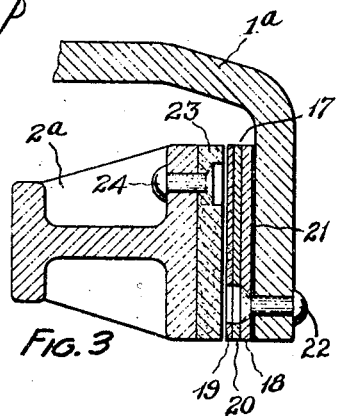
Figs. 3 and 4 are fragmentary sectional views corresponding to Fig. 2 but showing two different modifications of the construction shown in Fig. 2.

The modified construction shown in Fig. 3 of the drawings has the brake drum 1ª provided with a multiple-layer lining 17 comprising a steel layer 18, a facing layer 19 of sintered metallic material of the same character as the layer 8 of the first described construction, and an intermediate layer 20 of solid copper. Such a construction may be conveniently provided by using copper-clad steel strip material of known character or by electroplating a solid layer of copper on sheet steel to produce the layers 18 and 20 and attaching to the copper layer the sintered facing layer 19. The strip 17 is also preferably provided with a thin layer 21 of sintered metal to insure good union between the lining and the drum 1ª, the lining being mechanically secured to the drum by rivets 22. The sintered layers 19 and 21 may be formed and bonded to the steel-copper strip 18, 20 by sintering, as above described.

In the modified construction the shoe 2ª is fitted with a friction facing 23 of the molded fibrous material type, the facing being secured in well known manner by rivets 24. Such molded facing materials are porous in character and susceptible of local thermal expansion and contraction without disintegration. Also they operate satisfactorily against the sintered metallic facings, such as the facing layer 19, if the working temperatures and pressures are not too high; but such molded materials are relatively poor conductors of heat and it will therefore be apparent that with the construction of Fig. 3 a larger proportion of the heat generated by the brake must be dissipated through the brake drum than in the case of the first described construction. For the reasons stated, sintered metallic friction facings for the brake shoes are to be preferred. In all cases at least one of the two structures having mutual frictional engagement should have its porous facing formed of the predominantly metallic compacted and sintered powder material and such facing should have good heat-conducting connection with a solid metal part of the structure capable of absorbing and dissipating the heat generated in the operation of the apparatus.

Figure 4:
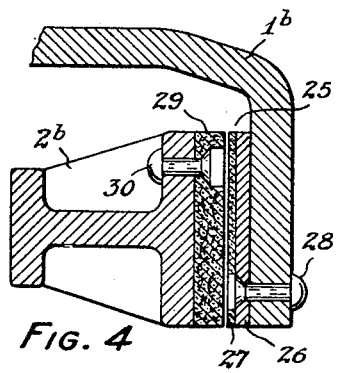

An alternative embodiment of the three-layer structure is shown in Fig. 4 where the cylindrical part of brake drum 1ᵇ serves as the strong structural layer and is fitted with a multiple-layer lining 25 comprising a layer 26 of solid copper faced with a layer 27 of sintered finely divided friction material composed predominantly of high-melting-point metal, preferably copper or iron or a mixture of the two. The layer 27 is integrally bonded directly to the layer 26 by sintering in accordance with known practice previously mentioned. The lining 25 is secured to the drum 1ᵇ by rivets 28. With the mutually engaging surfaces of the parts 1ᵇ and 26 formed to fit nicely together, the rivets 28 serve to intimately unite the layer 26 and the structural layer formed by the cylindrical wall of the drum. This type of construction is made feasible by the fact that the solid metal layer 26 of high conductivity is also sufficiently rugged to make the riveted connection with the wall of the drum rigid and durable and capable of maintaining the desired intimate union between the intermediate layer and the backing layer of the three-layer structure.

The brake shoe 2ᵇ of this last construction is generally similar to the shoe 2ª of Fig. 3 and has a renewable facing 29 of molded fibrous material secured by rivets 30, the facing being of the same character as the facing 23 of Fig. 3.

In Fig. 5 of the drawings is shown an embodiment of the present invention in a disc type of brake suitable for the landing wheels of large airplanes such as commercial transport planes and military bombers. As is well known, such planes must land at relatively high speeds and because of their great weight the brakes must absorb and transform in a short time large amounts of energy in order to bring the plane to rest within a ground run of reasonable length.

In the construction shown, 41 is a stub axle upon which is mounted a ground wheel, designated as an entirety by 42, suitable anti-friction bearings 43 and 44 being interposed between the axle and wheel. The wheel comprises two halves 42ª and 42ᵇ which are rigidly secured together by means of a circumferential series of bolts 45. To secure desired lightness, the wheel 42 may be made of suitable aluminum or magnesium alloy. On the inner side of each of the wheel halves 42ª and 42ᵇ is arranged an annular friction disc designated as an entirety by 46, said discs being secured to their respective wheel halves by circumferential series of bolts 47 and 48. Each of the discs 46 comprises a relatively thick layer 46ª of solid metal having high thermal conductivity, preferably copper, although aluminum may in some cases be used advantageously. The disc further comprises a friction facing 46ᵇ of sintered metallic material composed predominantly of high-melting-point metal. The layer 46ᵇ is integrally united to the layer 46ª of solid metal by sintering in known manner, as previously explained. Finally, the disc 46 comprises a thin layer 46ᶜ of deformable metal of high thermal conductivity and preferably is formed by sintering a layer of compacted copper powder to the back surface of the solid metal layer 46ª.

The annular discs 46 are formed on their outer and inner edges with circumferential series of radially extending slots 46ᵈ and 46ᵉ, respectively, to receive the securing bolts 47 and 48 and by tightening these bolts to a suitable degree, radial expansion and contraction of the discs 46 in relation to the wheel halves 42ª, 42ᵇ is permitted, this being a highly important feature of the construction because of the high temperatures which are attained by the discs 46.

Two movable disc shape brake elements 49 and 50 are disposed between the two discs 46, 46 and said discs 49 and 50 are non-rotatably connected with a sleeve 51 which is non-rotatably secured on the shaft 41 by means of splines 52. The sleeve 51 is formed with a peripheral series of radially extending teeth 51ª with which slots 49ª and 50ª in the inner edges of the discs 49 and 50 engage, this construction permitting lateral or axial movement of the discs. Between the discs 49 and 50 is arranged rubber tube expander 53 which is connected by means of a tubular extension 53ª with a nipple 56 which in turn communicates with a supply conduit 41ª in axle 41 so that compressed air or other fluid under pressure may be supplied to the rubber tube 53 to expand the brake discs 49, 50 toward the discs 45, 46. To restrain the rubber tube 53 while it is under pressure, the outer edges of the discs 49 and 50 are formed with mutually telescoping flanges 49ᵇ and 50ᵇ and similarly the inner edge of the tube 53 is supported by flanged members 54 and 55 secured to the inner sides of discs 49 and 50. To the faces of the discs 49 and 50 are secured, as by rivets, friction facings 57 and 58, respectively, of molded fibrous material, these facings being of annular ring form to match the annular form of the friction discs 45, 46. To insure free release of the brake, the discs 49 and 50 at their outer peripheries are provided with a circumferential series of lugs 49ᶜ, 50ᶜ which are engaged by coil springs 59, 59 that abut against the heads and nuts of bolts 60 which extend through apertures in the said lugs. In addition, similar release springs 61, 61 are mounted on bolts 62 carried by the discs 49, 50 at points radially inside of the friction surfaces of the brake.

The operation of the brake shown in Fig. 5 will be readily understood from the foregoing description and it will be apparent that the principles of the present invention which have been explained in connection with Figs. 1 and 2 find embodiment in this disc form of brake.

In the brake shown in Fig. 5 the molded asbestos facings 57 and 58 have been used because the relatively low thermal conductivity of this material protects the expansible rubber expander tube 53 from the heat generated during the application of the brakes. However, as was noted in connection with Fig. 3, the molded fibrous friction materials do not stand up as well as might be desired under very severe operating conditions and it may be desirable, under such conditions, to employ an alternative construction such as shown in Fig. 6. Here the movable brake disc 63 (corresponding to disc 49 in Fig. 5) has riveted to it an integral, two-layer friction member 64 comprising a layer 65 of solid copper and a facing layer 66 of sintered friction material composed predominantly of high-melting-point metal; and between the two-layer part 64 and the discs 63 is secured a heat-insulating layer 67 of asbestos or the like.

Whether the construction of Fig. 5 or that of Fig. 6 be employed, the necessity of directing the frictionally generated heat away from the non-rotating friction element and into the movable friction elements carried by the wheel, of course, makes the heat load thrown upon the latter elements all the greater and this renders the problem of providing friction elements capable of withstanding these conditions extremely difficult.

In Fig. 7 is shown an application of the present invention to a multiple disc type of brake which has found extensive application to the landing wheels of airplanes. In prior airplane brakes of this type the brake discs or rings were formed by applying to plain steel rings friction facings of compacted and sintered powder material composed predominantly of high-melting-point metals, and rings so surfaced were run against plain solid steel rings. Such brakes operated with a considerable degree of satisfaction when applied to airplanes of moderate size and weight but when the attempt is made still further to increase the rate of energy absorption serious difficulties are encountered, the brake discs being warped, contracted or otherwise distorted to an extent to unduly shorten the life of the brake.

These difficulties have been greatly reduced by the application of the principle of the present invention as shown in Fig. 7. Here 71 designates a stub axle upon which the wheel 72 is mounted with interposed antifriction bearings 73 and 74. The axle is provided with a brake flange 71ª on which annular reaction members 75 and 76 are secured by bolts 77 and suitable dowel pins (not shown). Between the reaction members 75 and 76 are disposed brake rings designated as entireties by 78 and cooperating brake rings designated as entireties by 79, there being three of the rings 78 and two of the rings 79. The middle one of the rings 78 comprises a steel ring 78ª which is formed at its inner edge with a circumferential series of teeth 78ᵇ to engage slots 75ª formed in the periphery of member 75. The ring further comprises friction facings 78ᶜ which are preferably formed of compacted and sintered material composed predominantly of high-melting-point metal and interposed metallic layers 78ᵈ, 78ᵈ of high thermal conductivity metal preferably formed by compacting and sintering powdered copper or the like. The two other rings 78 are similarly formed except that the layers 78ᶜ and 78ᵈ are omitted from one side of the steel ring 78ª.

The rings 79 are similar to the intermediate ring 78 except that their peripheral teeth 79ᵇ are formed on their outer edges instead of their inner edges. As shown in Fig. 9, the rings 79 comprise the steel core ring 79ª, the friction facings 79ᶜ and intermediate layers 79ᵈ. The teeth 79ᵇ of the rings 79 operatively engage slots 80ª formed on the inner side of a flange-like brake ring 80 which is secured by bolts 81 to the web of the wheel 72.

For actuation of the brake, the reaction member 75 is formed with an annular chamber 75ᵇ in which is operatively mounted an annular plunger 82 which engages a pressure plate 83 which in turn engages one of the rings 78. Pressure fluid is admitted to the chamber 75ᵇ through a suitable conduit 75ᶜ.

While the friction facings 78ᶜ of the rings 78 and the friction facing layers 79ᶜ of the rings 79 may, if desired, be formed of sintered material of the same composition, I have found it satisfactory to make the material for the facing layers 78ᶜ predominantly of one metal and the material of the facings 79ᶜ of another metal or composition. For example, the composition of the facing layers 78ᶜ may have copper as their predominant constituent and the facing layers 79ᶜ may be formed of sintered iron powder or of a composition having iron as its predominant constituent.

In the operation of the brake shown in Fig. 7, the admission of pressure fluid into the chamber 75ᵇ effects the setting of the brake in well known manner and, as will be apparent, the multiple-layer friction rings function in the manner and with the advantageous results already described in connection with the first form of construction. With the improved construction described the warping and distortion of the friction rings and the accompanying contraction of the rings, especially of the rings anchored at their inner edges, so that they are prevented from the proper movement axially, are greatly reduced and effective operation over long periods of time is secured even under the most severe operating conditions.

The several forms of brake construction which have been described typify applications of the present invention in which the mutually engaging frictional members both are of the porous type and at least one of them is metallic and has its surface layer backed by a layer of high thermal conductivity, and in which therefore the advantages of both expedients are combined. Where the heat load to be carried is less severe the first of the two expedients may be advantageously applied alone, that is to say, without the use of the metal layer of high conductivity back of the surface or friction layer of the metallic facing or lining structure. An example of this latter type of construction is shown in the friction clutch illustrated in Figs. 11 to 15, inclusive, which has been successfully used as part of the drive of a supercharger for internal combustion engines.

As shown in Fig. 11 the device includes a frame structure 90 which carries a bearing 91 to rotatably support one end of shaft 92, a part of which is broken away together with additional bearing supporting means therefor. A gear 93, rotatably mounted upon the shaft 92, is designed to be driven by a larger gear, a portion of which is shown at 94 by broken lines. A drum 95 integrally formed with the gear 93 has internal teeth 95ª which mesh with a pinion 96 rotatably mounted on a flange 92ª on shaft 92. The pinion 96 in turn meshes with a spur gear 97 rotatably mounted on shaft 92.

The gearing described can be employed to drive the shaft 92 from the gear 94 by locking the gear 97 against rotation. For this purpose friction clutch means constructed in accordance with the present invention is provided. A clutch hub 98 is formed integral with the gear 97 to rotate therewith on shaft 92. Three clutch rings 99, 99 are arranged to be driven by the hub 98, the inner edges of the rings 99 being formed, as shown in Fig. 10, with notches to engage teeth or splines on the periphery of hub 98 in well known manner. Each of the rings 99 comprises a steel core 99ª and facing layers 99ᵇ, 99ᵇ of sintered metallic material of the character of the friction facing layers employed in the drum and disc brakes already described. The facing layers 99ᵇ are integrally attached to the cores 99ª by sintering in accordance with the method described in Patent No. 2,178,527 previously referred to.

Interposed between the clutch rings 99 are two clutch rings 100 comprising steel core parts 100ª and friction facing layers 100ᵇ, 100ᵇ of sintered metallic material of the same general character as the friction facings 99ᵇ of rings 99. The rings 100 are formed on their outer periphery with lugs or teeth to engage slots in a housing structure 101 which, together with a cylinder sleeve 102, is secured to the frame structure 90 by means of stud bolts 103 and nuts 104. To effect engagement of the clutch a fluid actuated piston 105 is provided. This piston is slidably mounted on the bearing sleeve 91 and has a peripheral piston ring 105ª to engage the cylinder sleeve 102. Pressure fluid may be admitted to the rear side of the piston 105 through a passage 90ª in the frame structure 90 and a coil spring 106 serves to retract the piston when the fluid pressure chamber is open to exhaust. The movement of the piston 105 under fluid pressure clamps the two sets of clutch rings between the piston and housing 101 in well known manner.

In the operation of the clutch drive mechanism, when it is desired to drive the shaft 92 from the gear 94 fluid pressure is admitted to piston 105 to engage the clutch and thus anchor the gear 97 to the frame structure. This in turn results in the rotation at reduced speed of shaft 92 through gear drum 95 and pinion 96, the latter functioning as a planetary gear.

In the construction of a clutch such as that shown in Fig. 11 the friction facing layers 99ᵇ and 100ᵇ of sintered metallic material may have the same composition, or the composition of the facing layers 100ᵇ may differ from that of the facing layers 99ᵇ. Facing layers of the same composition for rings 99 and 100 which have been found to operate satisfactorily have a composition which analyzes:

| | Per cent |
|---|---|
| Cu | 70.8 |
| Pb | 11.5 |
| Sn | 6.36 |
| $SiO_2$ | 4.55 |
| C (graphite) | 7.27 |
| | 100+ |

The clutch mechanism last described has in practice been operated in oil. It has been required to carry a load which by conventional standards is large in relation to its size and it has successfully done so because the sintered metallic facings of the mutually engaging clutch rings are capable of operating smoothly with a relatively high coefficient of friction, because the porous character of the mutually engaging facings enable them to sustain localized thermal expansion and contraction without deterioration and because the good thermal conductivity of the mutually engaging structures insures effective dissipation of the heat generated in the operation of the clutch.

Fig. 16 of the drawings shows an application of the invention to a frictional apparatus in the form of a step or thrust bearing. In this figure the numeral 111 designates a portion of a machine frame or wall section upon which shaft 112 is rotatably supported. The wall section 111 is provided with an upright bearing aperture 111ª in which is mounted a bearing bushing 113 which may be of any well known or conventional type. Wall 111 is formed on its upper side with a bearing boss 111ᵇ with a plain upper surface to which is secured a bearing ring designated as an entirety by 114 and comprising a steel ring or disc 114ª, a friction facing 114ᵇ preferably of condensed and sintered friction material composed predominantly of high-melting-point metal, an intermediate layer 114ᶜ formed of metal of high thermal conductivity and preferably made by compacting and sintering copper powder or the like, and a layer 114ᵈ preferably of sintered copper. The bearing ring 114 may advantageously constitute an integral unit, all of the four layers being bonded together by sintering in accordance with practice hereinbefore referred to and more fully described in United States Patent No. 2,178,527. The ring 114 is suitably apertured to receive screws 115 which secure it rigidly to the structure 111.

The shaft 112 is formed with a shoulder at 112ª to form an abutment for a heavy thrust ring 116 which is non-rotatably secured to the shaft 112 by a key or spline 117. A bearing ring, designated as an entirety by 118 is secured to ring 116 by screws 119. The ring 118 is an integral unit and comprises an iron or steel ring 118ª, a frictional facing layer 118ᵇ and an intermediate layer 118ᶜ, the said layers being of the same character, respectively, as the layers 114ᵇ and 114ᶜ, although if desired one of the facing layers 114ᵇ, 118ᵇ may be made predominantly of copper and the other predominantly of iron or the two facing layers may be made predominantly of different mixtures of copper and iron or of other high-melting-point metal. Conventional means may be provided to supply lubricant to the mutually engaging surfaces of the facing layers 114ᵇ and 118ᵇ or the compositions of these layers may be made such as to supply the requisite lubrication, bearing mixtures of this character being well known.

In the construction shown in Fig. 16 the lower bearing ring 114 is provided with the layer 114ᵈ of deformable metal to insure good thermal conductivity between the ring 114 and the structure 111 and thus secure the conduction to the structure 111 of the major part of the heat generated between the friction surfaces of the bearing, the larger and more massive member 111 of the bearing structure being better adapted to absorb and dissipate heat than would the upper thrust ring 116.

In the operation of a bearing such as is shown in Fig. 16 it is apparent that there is a realization of the combined advantages of both of the expedients which have been described, namely, (1) the porous character of the friction facings of both of the pair of mutually engaging structures and the high thermal conductivity of at least one of those structures and (2) the highly conductive backing layers for those facings.

From the foregoing description of the several illustrative devices it will be seen that there is present in each the basic feature of the present invention, namely, the provision of porous frictional facings for both of the pair of mutually engaging members with at least one of those members formed of metallic materials for adequate thermal conductivity and the dissipation of the frictionally generated heat. In all except one of the disclosed embodiments at least one of the frictional members is metallic and has its frictional facing backed by a layer of high conductivity. As is indicated in application Serial No. 443,562, now U. S. Patent No. 2,381,941, the latter feature and the aforesaid basic feature are advantageously combined, although each is separately useful. Whether, in any particular case, both features are to be combined or the basic feature of the present invention is to be used alone, will depend upon the nature of the service to be performed, for example, upon the size and continuity of the heat load, and the ease or difficulty of maintaining normal operating conditions (as when the frictional members are to be supplied with oil lubrication which may fail at times). When the operating conditions are extremely severe in these or other respects it will be advantageous to combine both expedients.

In connection with the porous character of the mating frictional members it is to be observed that this characteristic gives both of the mutually engaging facings a capacity for embedment of loose hard particles which might otherwise cause scoring with resultant serious wear and deterioration.

The terms "high temperatures," "high-melting-point" and "high thermal conductivity" are used herein in the same senses as in the above noted application Serial No. 443,562, now U. S. Patent No. 2,381,941. Thus the term "high thermal conductivity" as applied to the metal of the backing layer next to the facing layer of the multiple-layer structures, is to be understood as any thermal conductivity not substantially less than 0.40 calories per second per centimeter per square centimeter per degree Centigrade. The said application Serial No. 443,562, now U. S. Patent No. 2,381,941, may be referred to for more detailed information and discussion relative to the multiple-layer structures.

It is to be understood that the present invention is not limited to the specific forms of construction illustrated but may be embodied in other equivalent forms of construction within the scope of the appended claims.

What is claimed is:

1. In frictional apparatus in the operation of which slippage occurs between the opposing surfaces of mutually engaging structures, the combination of a first structure comprising a facing layer which is porous in comparison with solid metal and formed of material chosen from molded fibrous friction material and predominantly metallic compacted and sintered powder material; and a second structure comprising a facing layer which also is porous in comparison with solid metal and is formed of predominantly metallic compacted and sintered powder material and further comprising solid metal parts which have good heat-conducting connection with its facing layer and are capable of absorbing and dissipating heat generated by the frictional engagement of the two structures.

2. Frictional apparatus as claimed in claim 1 in which the facing layer of the first frictional structure is composed of the predominantly metallic compacted and sintered powder material.

3. Frictional apparatus as claimed in claim 1 in which the facing layer of the first frictional structure is composed of the molded fibrous friction material.

4. Frictional apparatus as claimed in claim 1 in which the second structure has its facing layer composed predominantly of high melting point metal and comprises a second layer integrally united to the back of the facing layer and formed of metal having a high melting point and a thermal conductivity high in comparison with that of the facing layer.

5. In frictional apparatus in the operation of which slippage occurs between the opposing surfaces of mutually engaging structures, the combination of a first structure having a facing layer which is porous in comparison with solid metal and formed of material chosen from molded fibrous friction material and predominantly metallic compacted and sintered powder material, such structure comprising a layer formed of material of low thermal conductivity in comparison with metals and disposed generally parallel to the frictional surface of said structure; and a second structure comprising a structural layer of solid metal, a frictional facing layer of compacted and sintered powder material composed at least predominantly of high-melting-point metal, an intermediate layer disposed between the other said layers and formed of metal of high melting point and having high thermal conductance parallel to the said layers in comparison with the facing layer and the structural layer, the intermediate layer having a thermal conductivity not substantially less than 0.40 cal./sec./ cm./sq. cm./deg. C. and being integrally bonded to the facing layer substantially throughout their adjacent surfaces, and means intimately uniting the intermediate layer and the structural layer substantially throughout their mutually adjacent surfaces, the several layers, the integral bond between the facing layer and the intermediate layer and the means uniting the intermediate layer and the structural layer all being capable in operation of the apparatus of withstanding high temperatures without disintegration.

6. Frictional apparatus as claimed in claim 5 in which the facing layer of the first structure is formed of molded fibrous friction material and constitutes also the layer of low thermal conductivity of said structure.

7. Frictional apparatus as claimed in claim 5 in which the first structure comprises a supporting part and a facing layer composed predominantly of metal and has its layer of low thermal conductivity interposed between the supporting part and the facing layer.

SAMUEL K. WELLMAN.

REFERENCES CITED

The following references are of record in the file of this patent:

UNITED STATES PATENTS

| Number | Name | Date |
| --- | --- | --- |
| 1,850,563 | Norton | Mar. 22, 1932 |
| 1,872,796 | Norton | Aug. 23, 1932 |
| 2,028,573 | Surtees | Jan. 21, 1936 |
| 2,178,527 | Wellman | Oct. 31, 1939 |
| 2,251,410 | Koehring et al. | Aug. 5, 1941 |
| 2,359,361 | Gleszer et al. | Oct. 3, 1944 |
| 2,381,941 | Wellman et al. | Aug. 14, 1945 |